(12) United States Patent
Dowty et al.

(10) Patent No.: US 8,056,857 B2
(45) Date of Patent: Nov. 15, 2011

(54) AIRCRAFT SEAT WITH UPRIGHT SEAT BACK POSITION INDICATOR

(75) Inventors: Mark Brian Dowty, Rural Hall, NC (US); Michael Furrer, Lewisville, NC (US)

(73) Assignee: BE Aerospace, Inc., Wellington, FL (US)

( * ) Notice: Subject to any disclaimer, the term of this patent is extended or adjusted under 35 U.S.C. 154(b) by 575 days.

(21) Appl. No.: 12/279,554

(22) PCT Filed: Feb. 13, 2007

(86) PCT No.: PCT/US2007/062033
§ 371 (c)(1),
(2), (4) Date: Aug. 15, 2008

(87) PCT Pub. No.: WO2007/095522
PCT Pub. Date: Aug. 23, 2007

(65) Prior Publication Data
US 2010/0230540 A1    Sep. 16, 2010

Related U.S. Application Data

(60) Provisional application No. 60/773,751, filed on Feb. 15, 2006.

(51) Int. Cl.
*B60N 2/22* (2006.01)

(52) U.S. Cl. .............. 244/118.6; 244/122 R; 297/217.2; 297/463.2

(58) Field of Classification Search ................ 297/61, 297/217.2, 463.2; 244/118.6, 122 R
See application file for complete search history.

(56) References Cited

U.S. PATENT DOCUMENTS

| | | | | |
|---|---|---|---|---|
| 3,021,098 | A | * | 2/1962 | Spound .......................... 297/61 |
| RE25,375 | E | * | 4/1963 | Lorenz .......................... 297/61 |
| 5,762,401 | A | * | 6/1998 | Bernard .................. 297/378.13 |
| 5,855,414 | A | * | 1/1999 | Daniel et al. ............. 297/378.13 |
| 6,050,633 | A | * | 4/2000 | Droual .......................... 297/61 |
| 6,192,565 | B1 | * | 2/2001 | Tame ............................. 297/61 |
| 7,226,129 | B2 | * | 6/2007 | Brandes et al. .......... 297/378.13 |
| 7,625,046 | B2 | * | 12/2009 | Sanchez ........................ 297/353 |
| 2001/0011839 | A1 | * | 8/2001 | Mori ........................ 297/256.13 |
| 2002/0198653 | A1 | | 12/2002 | Lutter |
| 2003/0125845 | A1 | | 7/2003 | Carlstedt et al. |

FOREIGN PATENT DOCUMENTS

| | | |
|---|---|---|
| DE | 296 13 291 U1 | 11/1996 |
| DE | 102006016807 A1 | 10/2007 |
| EP | 1 132 291 A2 | 9/2001 |
| EP | 1457947 A1 | 9/2004 |
| EP | 1 547 921 A2 | 6/2005 |
| WO | 03001474 A2 | 1/2003 |

OTHER PUBLICATIONS

May 12, 2011 European Search Report in European Patent Application No. 07756902.8.

\* cited by examiner

*Primary Examiner* — Peter R. Brown
(74) *Attorney, Agent, or Firm* — Oliff & Berridge PLC

(57) ABSTRACT

An aircraft passenger seat that includes a frame with a seat bottom mounted for translating fore and aft movement, and a seat back linked to the seat bottom and mounted for generally vertical movement between a lowered and upright position. A stationary seat back shell assembly is provided within which the seat back is mounted for movement. A seat back position indicator is carried by the shell proximate a top end thereof and cooperates with the seat back. The seat back position indicator has a first condition indicating that the seat back is in the lowered position within the shell and a second condition indicating that the seat back is in the upright position within the shell.

18 Claims, 14 Drawing Sheets

AIRCRAFT SEAT WITH UPRIGHT SEAT BACK POSITION INDICATOR

CROSS-REFERENCE TO RELATED APPLICATIONS

This application claims the benefit of Provisional Application No. 60/773,751, filed on Feb. 15, 2006.

TECHNICAL FIELD AND BACKGROUND OF THE INVENTION

This invention relates to a seat back position indicator. The apparatus is particularly suited for passenger seats on conveyances such as passenger aircraft, where large numbers of people are seated in closely-spaced ranks and files, and must be observed by cabin staff at various times during the flight, such as during take-off, landing, in-flight emergencies and turbulent weather. Ordinarily, during these events the flight attendants must make a general announcement that seat backs and tray tables must be moved to a full upright and locked position. Then, the staff must circulate through the cabin to visually observe each seat back and determine that it has, in fact, been moved to the correct position. As aircraft have become larger and seat spacing more dense, it is correspondingly more difficult for the cabin staff to properly visually observe and verify that the seat backs are in the correct position.

Moreover, some aircraft seats now have seat backs that include a shell or other seat back component that remains in essentially the same position so that it does not encroach on the space of the aft-seated passenger. The padded seat back itself is positioned forward of the shell and moves within the area forward of the shell. In these instances, it is very difficult or impossible to visually determine whether the seat back itself is upright, because the shell of the seat remains upright in the same position at all times and blocks direct visual observation of the seat, particularly from the sides and rear.

In still other instances, the seat back may rotate only slightly downwardly without significant rearward movement, making it difficult for the cabin staff to observe the seat back position in relation to the surrounding seat backs.

Prior art seat back indicators have included lights incorporated into the seat backs to provide an illuminated indication of seat back position. Other seat designs incorporate sensors that transmit seat back and seat belt position status wirelessly to a cabin control panel or to a hand-held personal device used by the flight attendants. These designs are expensive, place further load on the aircraft electronics and power supplies, and are subject to abuse or damage from wear and tear. Thus, such designs may be more suitable in some aircraft environments than in others.

The invention disclosed in the application provides a relatively inexpensive, mechanically simple and reliable method of verifying passenger seat back position in a conveyance such as an aircraft.

SUMMARY OF THE INVENTION

Therefore, it is an object of the invention to provide a seat back position indicator for a passenger seat.

It is another object to provide a seat back position indicator for a passenger seat that is readily visible from a number of varying positions relative to the seat.

It is another object to provide a seat back position indicator for a passenger seat that is relatively inexpensive, robust and reliable.

It is another object to provide a seat back position indicator for a passenger seat that is particularly suited for use with a seat that has a stationary, upright, non-encroaching seat back shell assembly.

It is another object to provide a seat back position indicator for a passenger seat that does not require electronics or electricity to operate, but may optionally be equipped with an electric sensor so that the seat back position indicator is transmitted to a remote device for observation by a cabin staff member.

These and other objects and advantages of the invention are achieved in a visual seat position indicator apparatus for providing an indication that a seat having a seat bottom, and a seat back movable between reclined and an upright position, is in either its upright or reclined position, including a visual indicator mounted for movement on a visually-exposed surface of an upper portion of the seat back; and a mechanical linkage acting between the visual indicator and the seat back for moving the indicator in response to movement of the seat back, the relationship of the indicator to the seat back providing a visual indication of the position of the seat back.

According to one embodiment of the invention, the indicator is a button mounted on the upper portion of the seat back.

According to another embodiment of the invention, the apparatus includes a bezel mounted on the upper portion of the seat back and surrounding the button, the position of the button in relation to the surrounding bezel providing the visual indication of the position of the seat back.

According to yet another embodiment of the invention, the linkage includes a pusher acting on the button to allow it to move as the seat back moves.

According to yet another embodiment of the invention the seat back includes a stationary seat back shell assembly within which the seat back moves, and the indicator is mounted for movement on a visually-exposed surface of seat back shell assembly to provide a visual indication of the position of the seat back within the seat back shell assembly.

According to yet another embodiment of the invention the seat back includes a stationary seat back shell assembly within which the seat back moves and a bezel mounted on an upper, visually-exposed surface of the seat back shell assembly. A button is mounted for movement within the bezel; and a linkage allows the seat back and the button to move in relation to the bezel to provide a visual indication of the position of the seat back within the seat back shell assembly.

According to yet another embodiment of the invention the linkage is adapted to allow the button to move downwardly into the bezel to expose adjacent interior walls of the bezel as the seat back is reclined, and the interior wall of the bezel has a surface condition that is visually distinct from the surface condition of the button, wherein when the button is withdrawn into the bezel, the interior walls of the bezel provide the visual indication that the seat back is in the reclined position.

According to yet another embodiment of the invention the linkage includes a pusher acting on the button.

According to yet another embodiment of the invention, the surface condition of the interior wall of the bezel comprises a color and the surface condition of the button comprises a color that is visually distinct from the color of the interior wall of the bezel, wherein when the button is withdrawn into the bezel, the interior walls of the bezel provide the visual indication that the seat back is in the reclined position.

According to yet another embodiment of the invention, an aircraft passenger seat is provided that includes a base on which is positioned a seat bottom and a seat back movable between reclined and an upright position, and a visual seat back position indicator mounted for movement on a visually-exposed surface of an upper portion of the seat back. A mechanical linkage acts on the visual indicator for moving the indicator in response to movement of the seat back, and the relationship of the position of the indicator to the seat back provides a visual indication of the position of the seat back.

According to yet another embodiment of the invention, the indicator is a button mounted on the upper portion of the seat back.

According to yet another embodiment of the invention, a bezel is mounted on the upper portion of the seat back and surrounding the button, the position of the button in relation to the surrounding bezel providing the visual indication of the position of the seat back.

According to yet another embodiment of the invention, the seat back includes a stationary seat back shell assembly within which the seat back moves, and the indicator is mounted for movement on a visually-exposed surface of seat back shell assembly to provide a visual indication of the position of the seat back within the seat back shell assembly.

According to yet another embodiment of the invention, the seat back includes a stationary seat back shell assembly within which the seat back moves, and a bezel mounted on an upper, visually-exposed surface of the seat back shell assembly. A button is mounted for movement within the bezel, and a linkage acts on the button for moving the button in relation to the bezel to provide a visual indication of the position of the seat back within the seat back shell assembly.

According to yet another embodiment of the invention, the linkage is adapted to allow the button to move downwardly into the bezel to expose adjacent interior walls of the bezel as the seat back is reclined, and the interior wall of the bezel has a surface condition that is visually distinct from the surface condition of the button. When the button is withdrawn into the bezel the interior walls of the bezel provide the visual indication that the seat back is in the reclined position.

BRIEF DESCRIPTION OF THE DRAWINGS

The description of the invention proceeds with reference to the following drawings, in which.

DESCRIPTION OF THE PREFERRED EMBODIMENT AND BEST MODE

Figure 1:
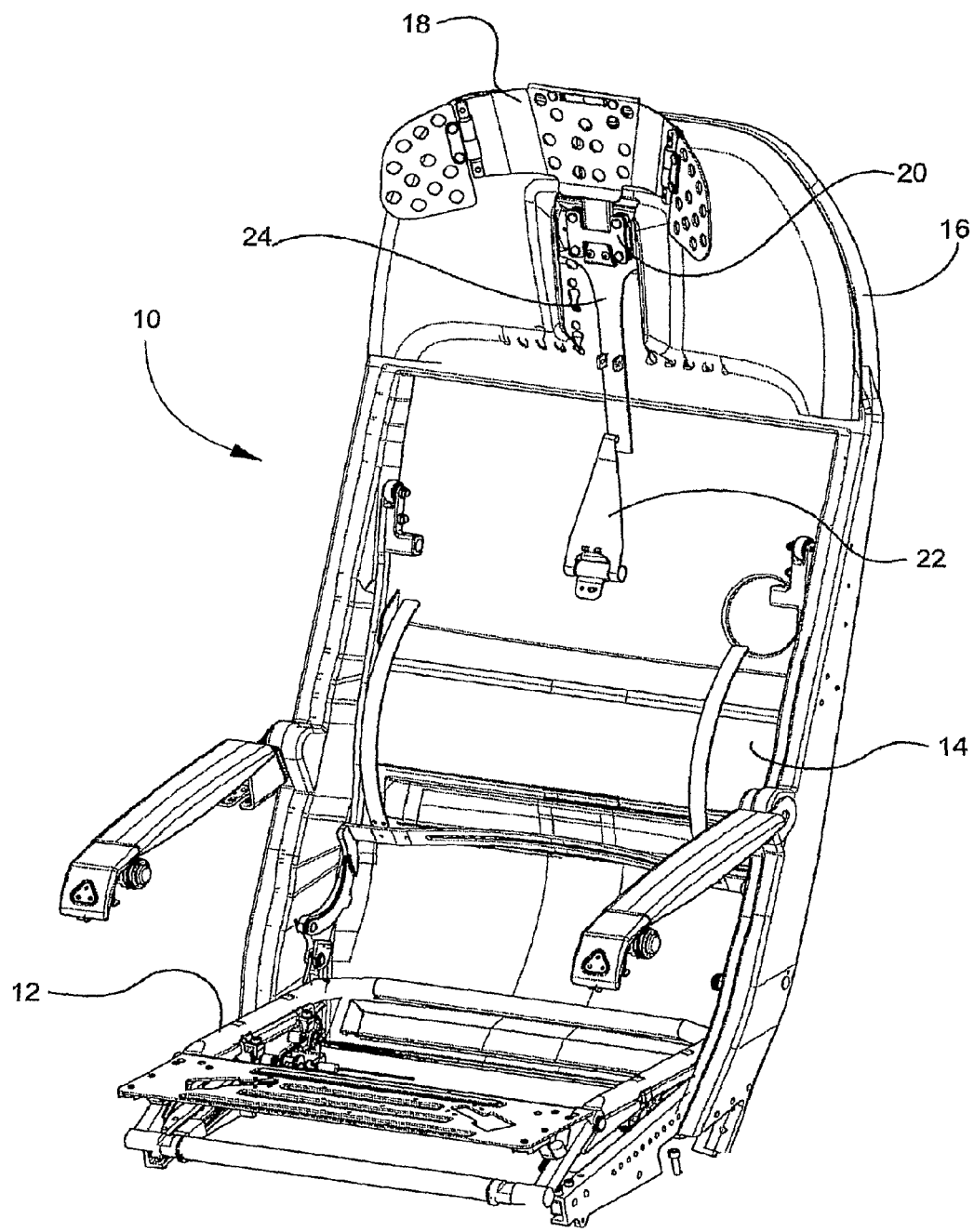
FIG. 1 is a partial perspective view of an aircraft passenger seat according to a preferred embodiment of the invention.
Figure 13:
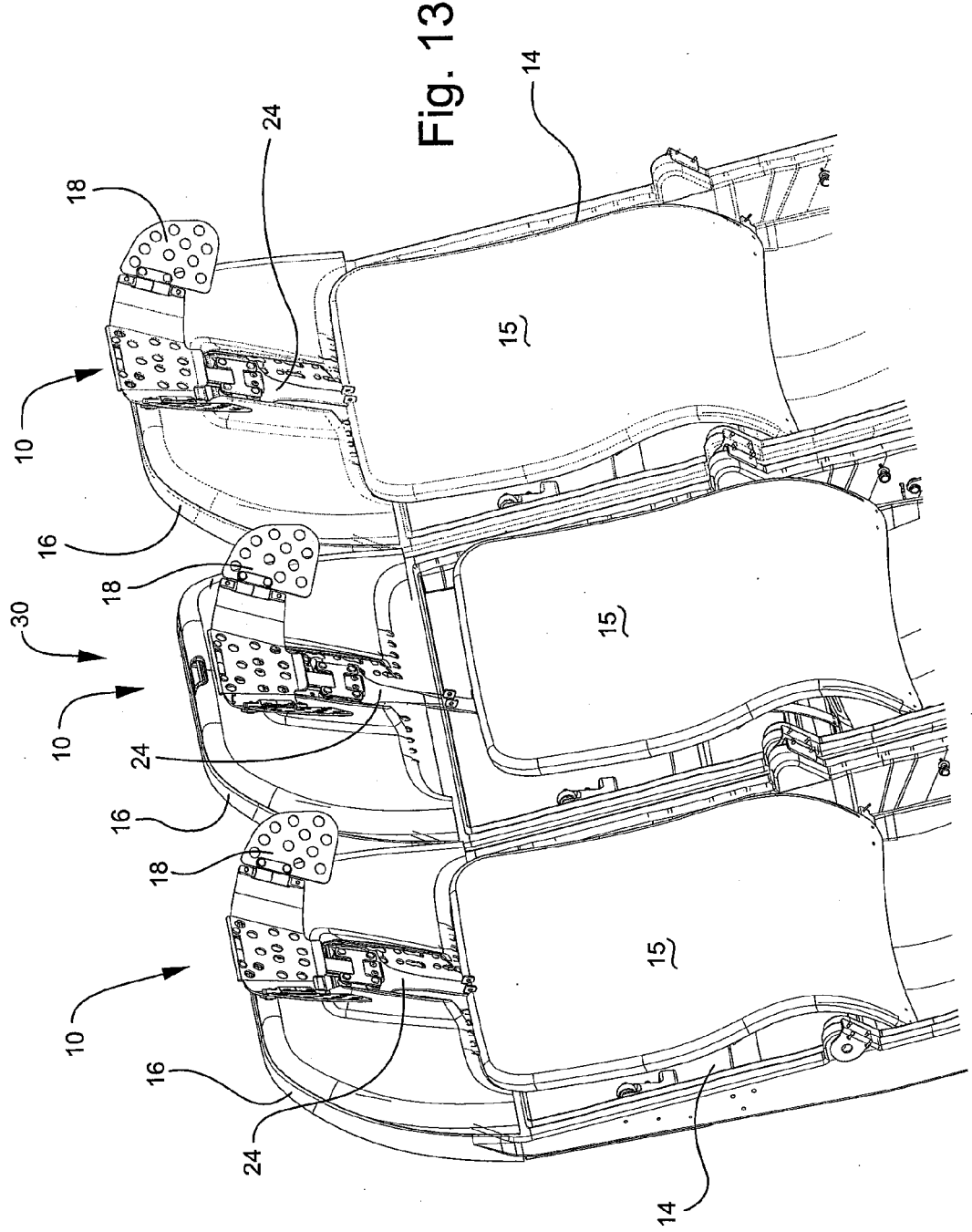
FIG. 13 is an upper, fragmentary, perspective view of a three seat passenger assembly showing the center seat in a reclined position and the two outboard seats in the upright position.

Referring now to the drawings, FIG. 1 shows an aircraft passenger seat 10 according to one embodiment of the invention. Seat 10 includes a fore-and-aft translating seat bottom assembly 12, and a seat back assembly 14, including a stationary seat back shell assembly 16 within which the seat back assembly 14 moves. A seat back rest 15 is shown in FIG. 13.

A headrest assembly 18 is mounted for sliding movement in a headrest bracket 20 near the upper end of the seat back assembly 14. In the illustrated seat 10, the seat bottom assembly 12 moves to initiate and achieve recline of the seat back assembly 14. When the seat bottom assembly 12 moves fore-and-aft, the seat back assembly 14 also moves in a generally corresponding down-and-up vertical plane. The seat 10 is removably attached to the deck of the aircraft by means of a base, not shown.

Figure 2:
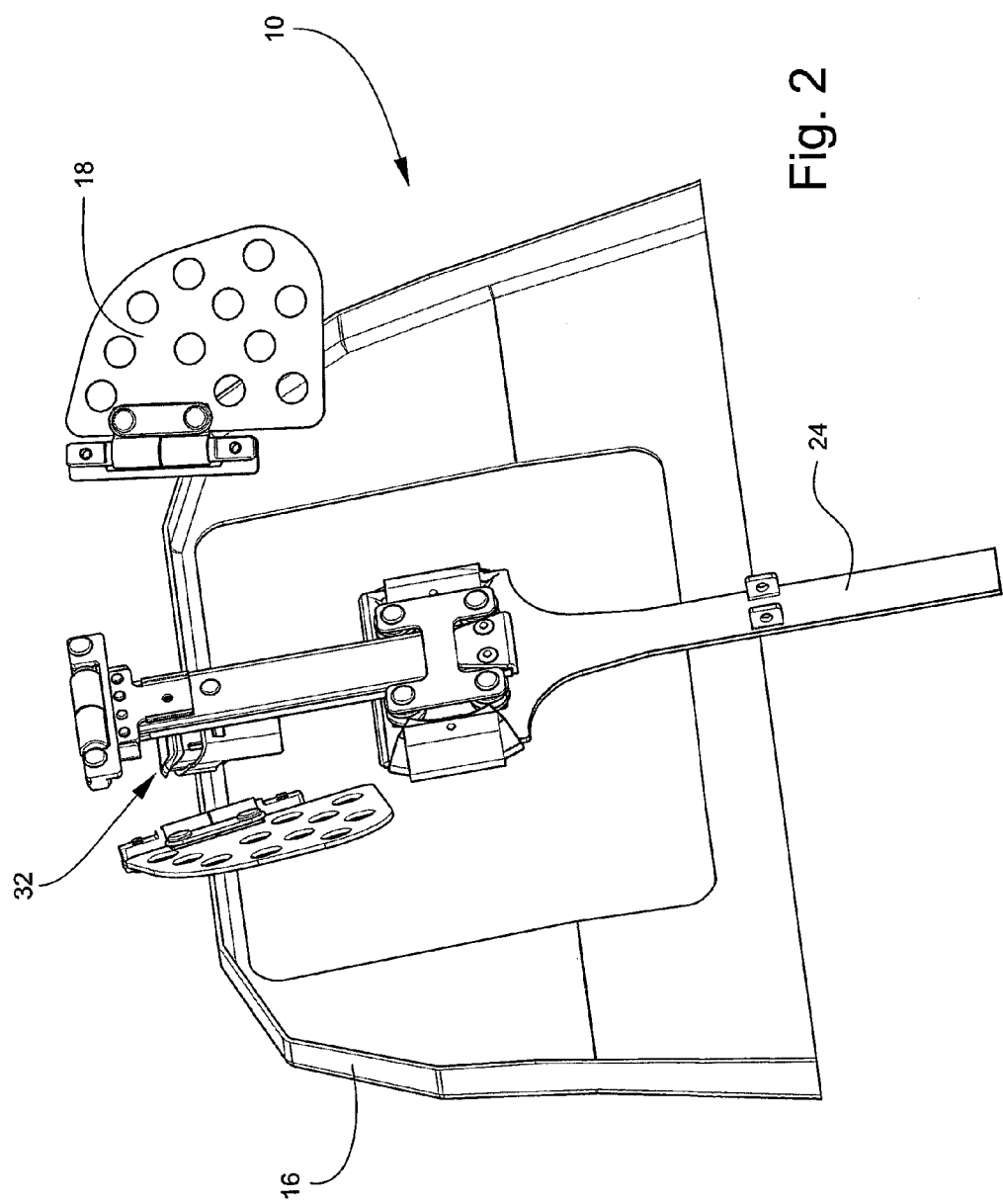
FIG. 2 is a fragmentary exploded view of the upper seat back portion of an aircraft passenger seat according to a preferred embodiment of the invention.
Figure 3:
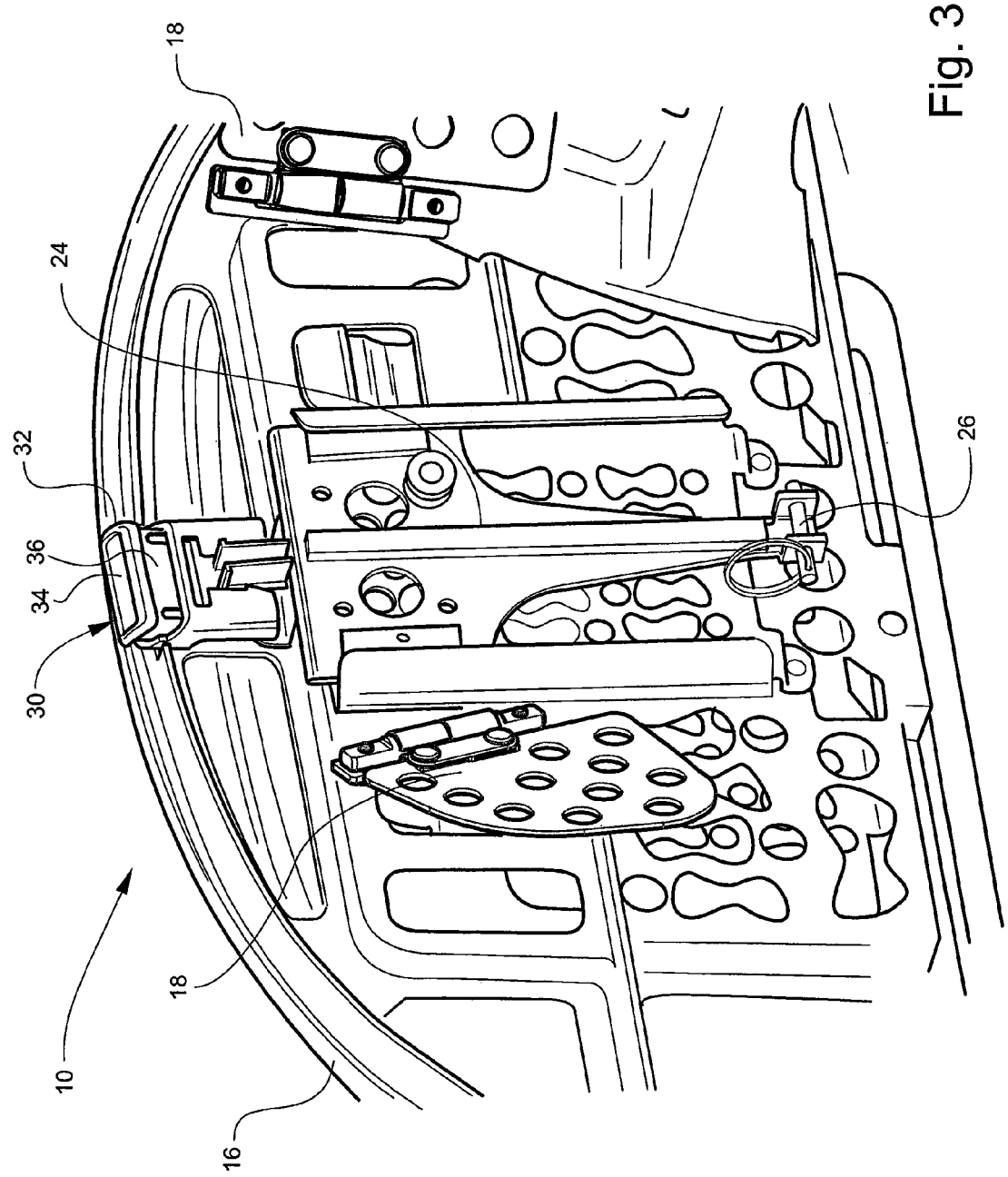
FIG. 3 is an upper, fragmentary perspective view of the upper seat back portion of an aircraft passenger seat according to a preferred embodiment of the invention.

As is shown in FIGS. 1, 2 and 3, a linkage, including a pusher 22 and a slide bar 24, is attached to the seat back assembly 14 via a ringed, pull pin 26, as is shown in FIG. 3, or another suitable attachment such as a bolt and nut. The seat bottom 12 assembly translates fore and aft as the seat position is varied by the seat occupant.

Figure 4:
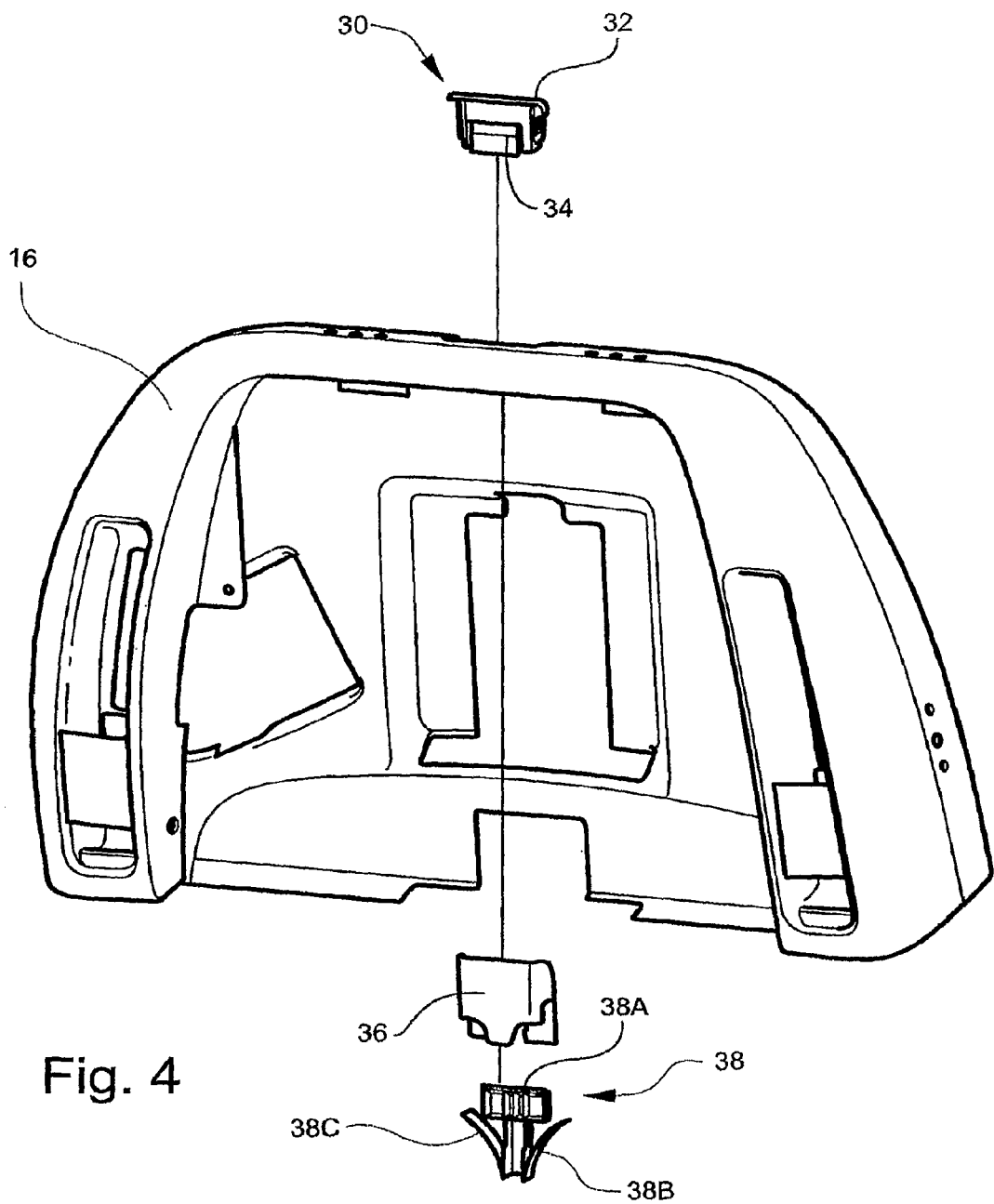
FIG. 4 is a fragmentary, generally rear elevation of the upper seat back portion of the button and bezel components.
Figure 5:
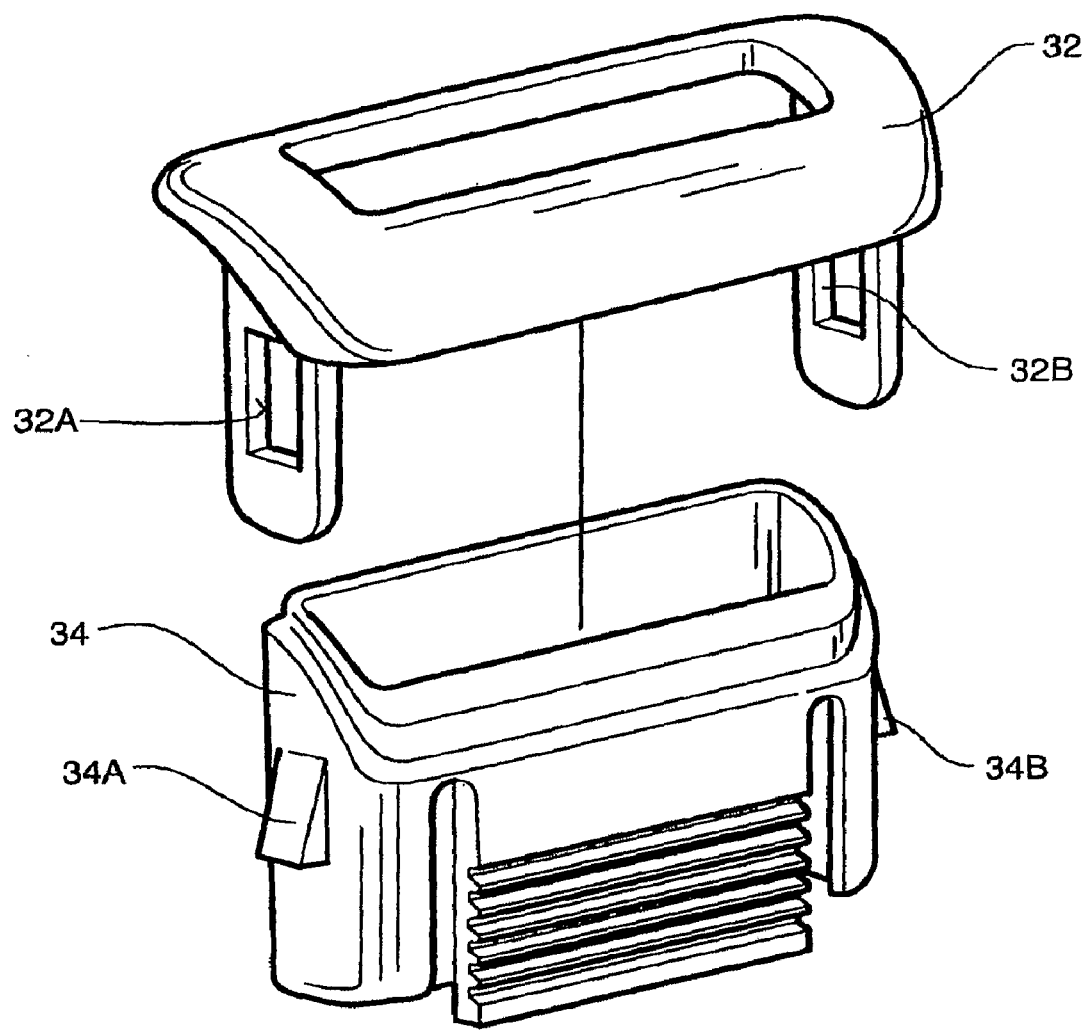
FIG. 5 is an exploded view of the bezel and the indicator collar.
Figure 6:
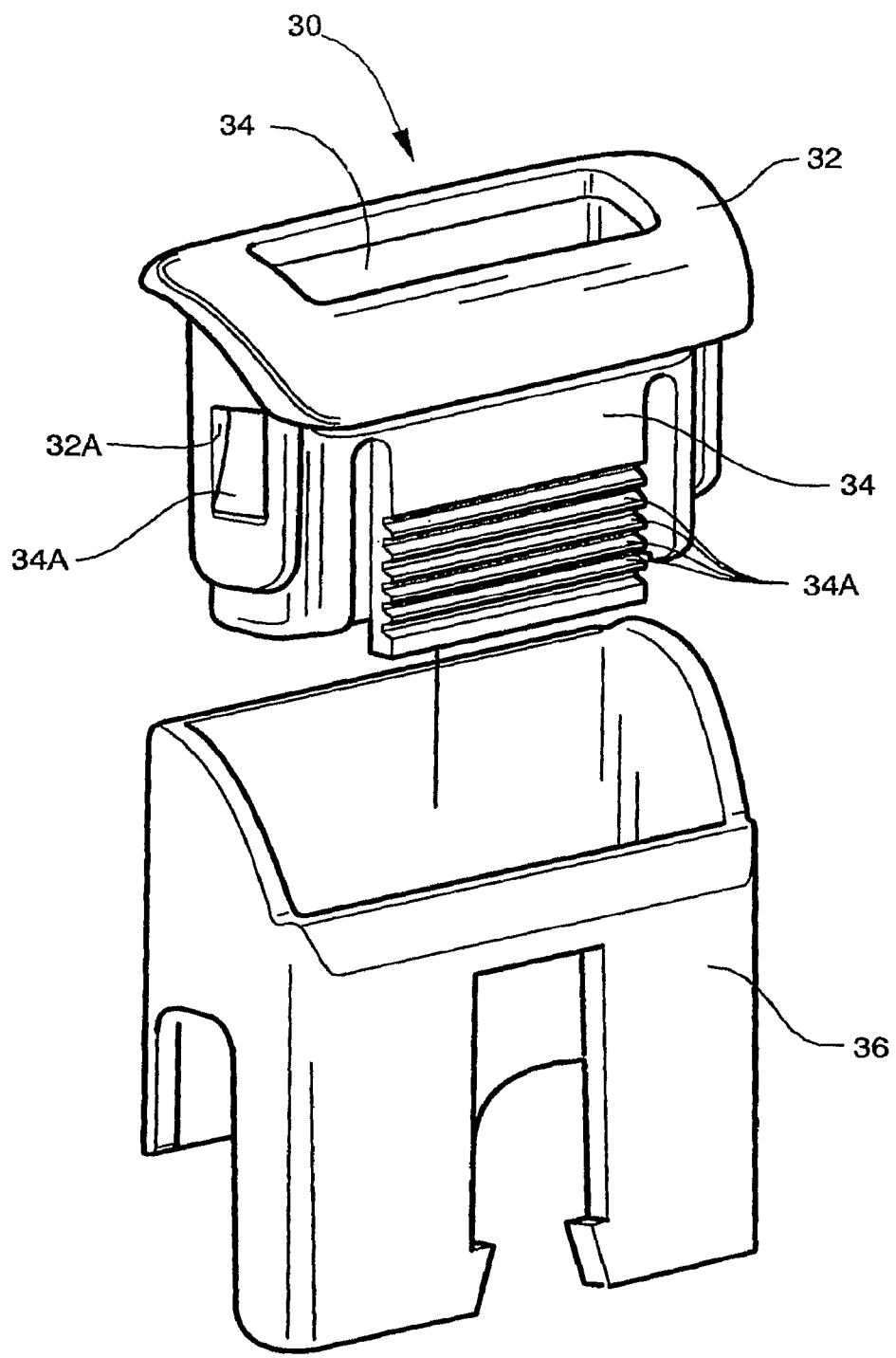
FIG. 6 is an exploded view of the joined bezel and indicator collar with the surround.

Referring now generally to FIGS. 4-9, a seat back position indicator 30 is mounted on the seat back assembly, as shown in FIG. 4, and provides a visual indication to the flight crew of the position of the seat back assembly within the stationary back shell assembly 16. The seat back position indicator 30 includes four components. As is best shown in FIG. 5, two of the components, a bezel 32 and indicator collar 34, snap together by means of ears 34A, 34B formed on opposing sides of the indicator collar 34 that fit into slots 32A, 32B in the bezel 32. Note the assembled unit in FIG. 6. The assembled bezel 32 and indicator collar 34 fit into a surround 36.

Figure 7:
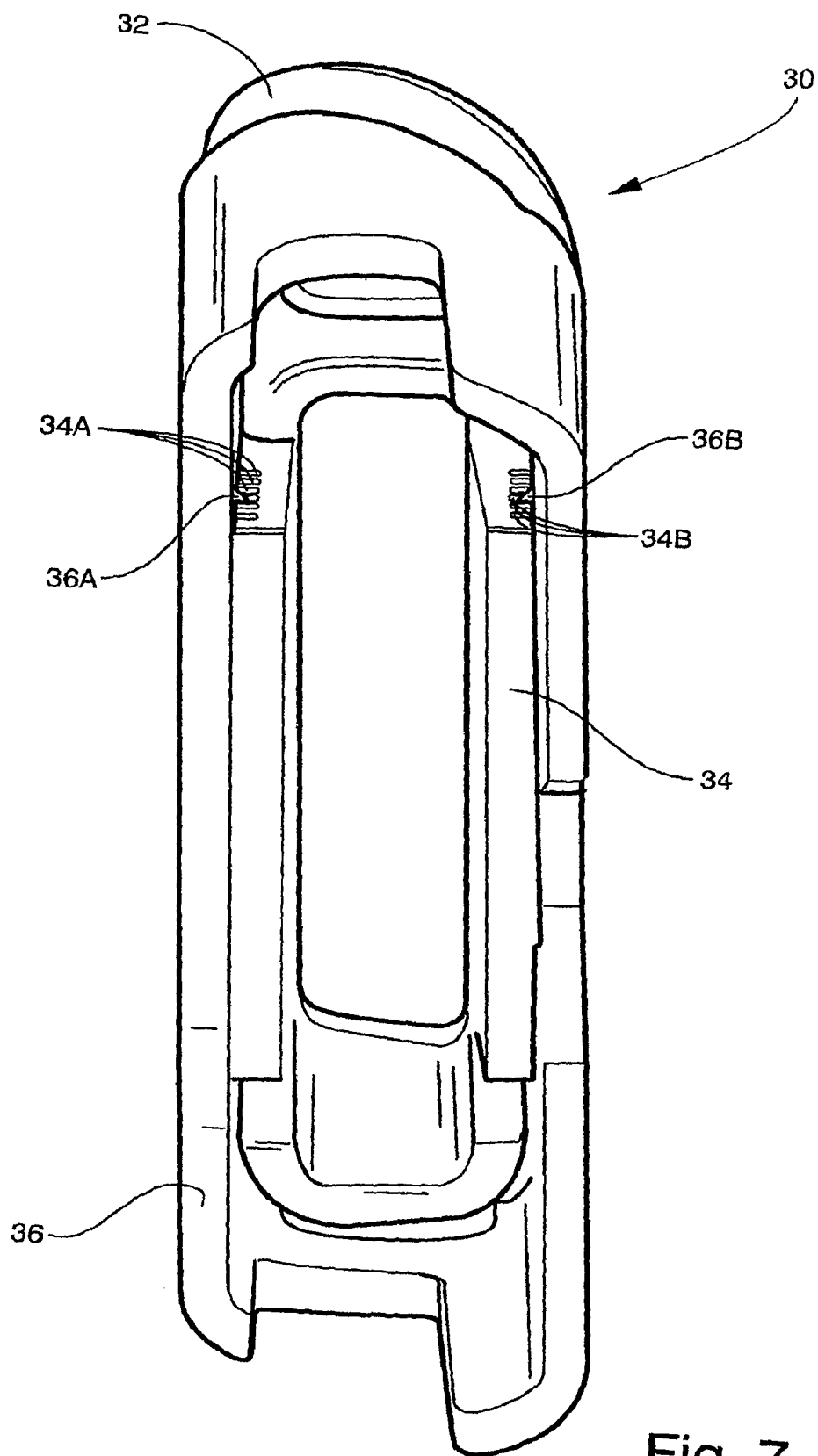
FIG. 7 is an internal view of the assembled indicator collar and surround.
Figure 8:
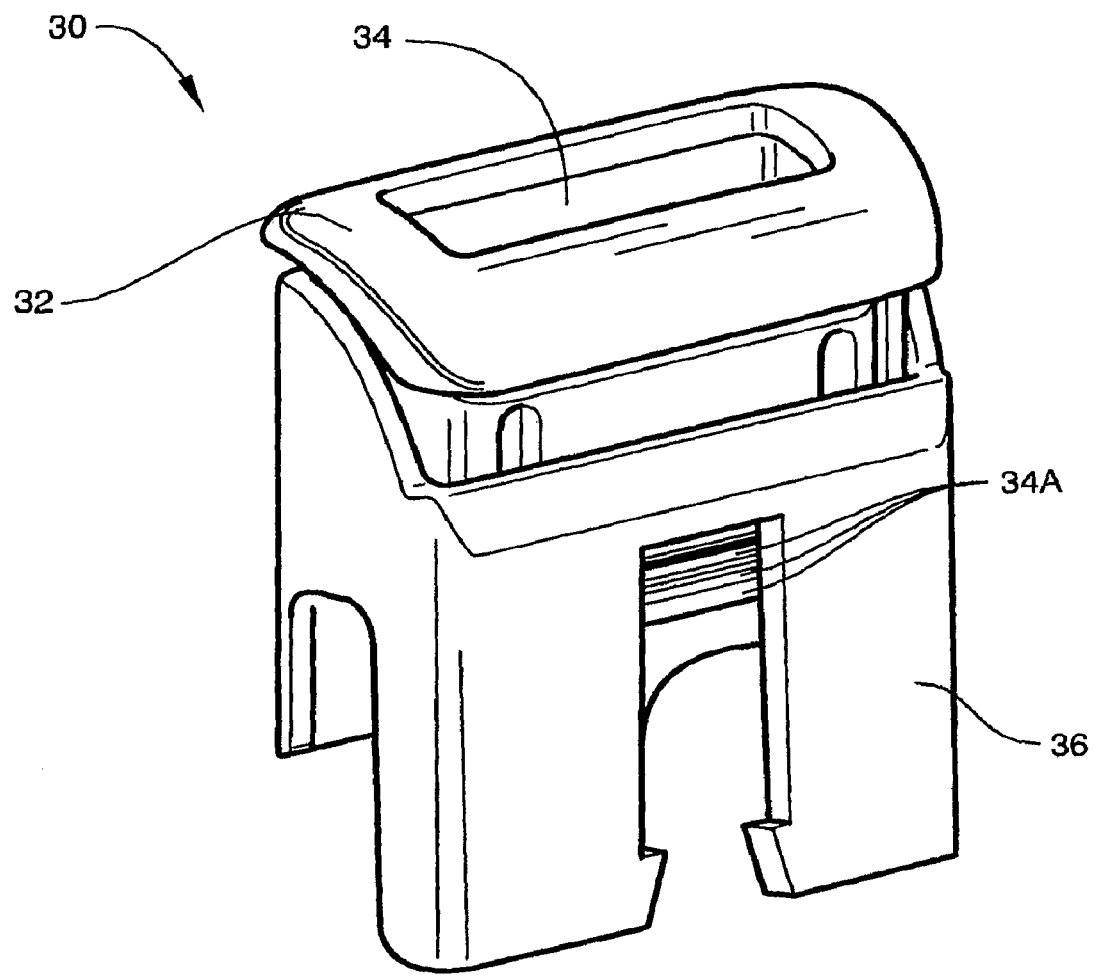
FIG. 8 is an assembled view of the bezel, indicator collar and surround of the seat position indicator.

Referring to FIG. 7, the surround 36 has a pair of transversely-extending internal ridges 36A, 36B that cooperates with one of a plurality of transversely-spaced ribs 34A, 34B on the opposed outer surfaces of the indicator collar 34. This allows the bezel 32 to be spaced from the surround 36, as shown in FIG. 8. The space allows for the thickness of plastic or leather seat coverings to fit between the bezel 32 and surround 36.

Figure 9:
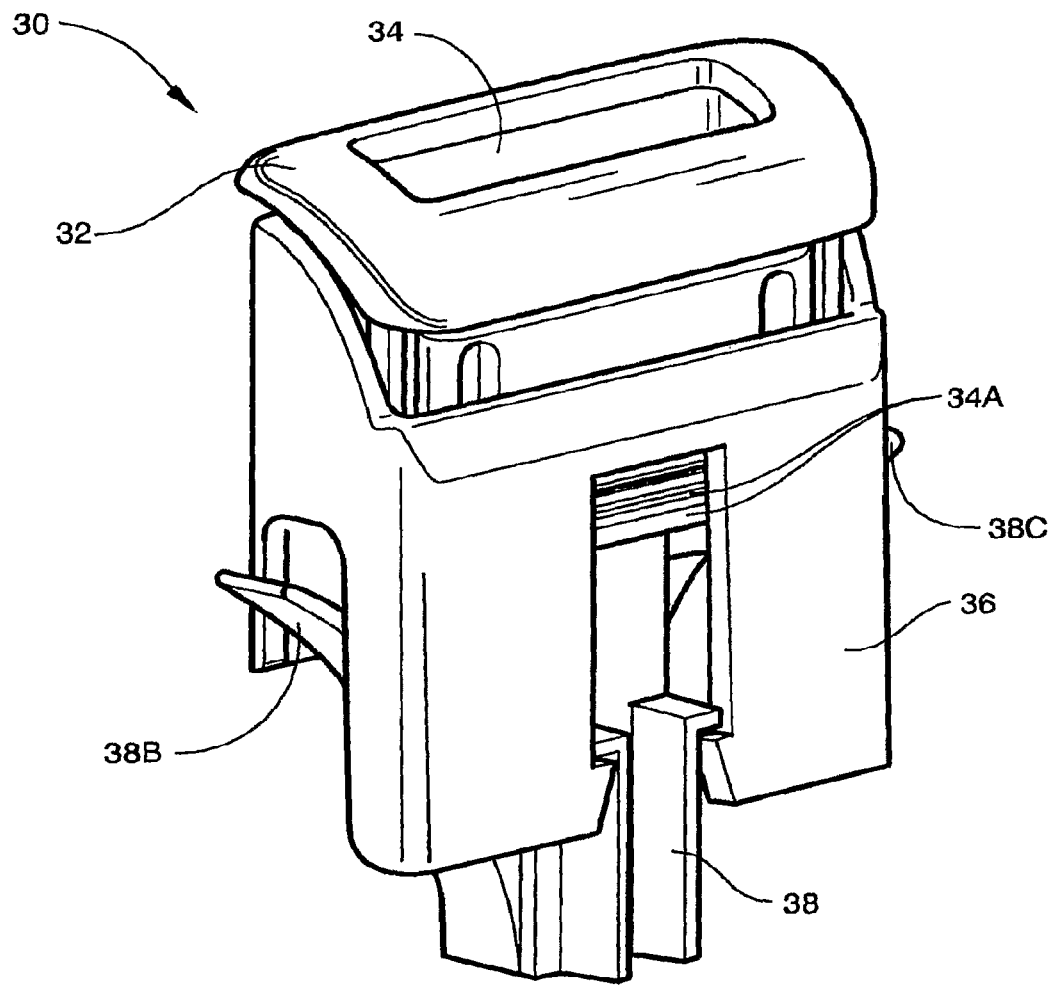
FIG. 9 is an assembled view of the seat position indicator in the "not-upright" position.
Figure 10:
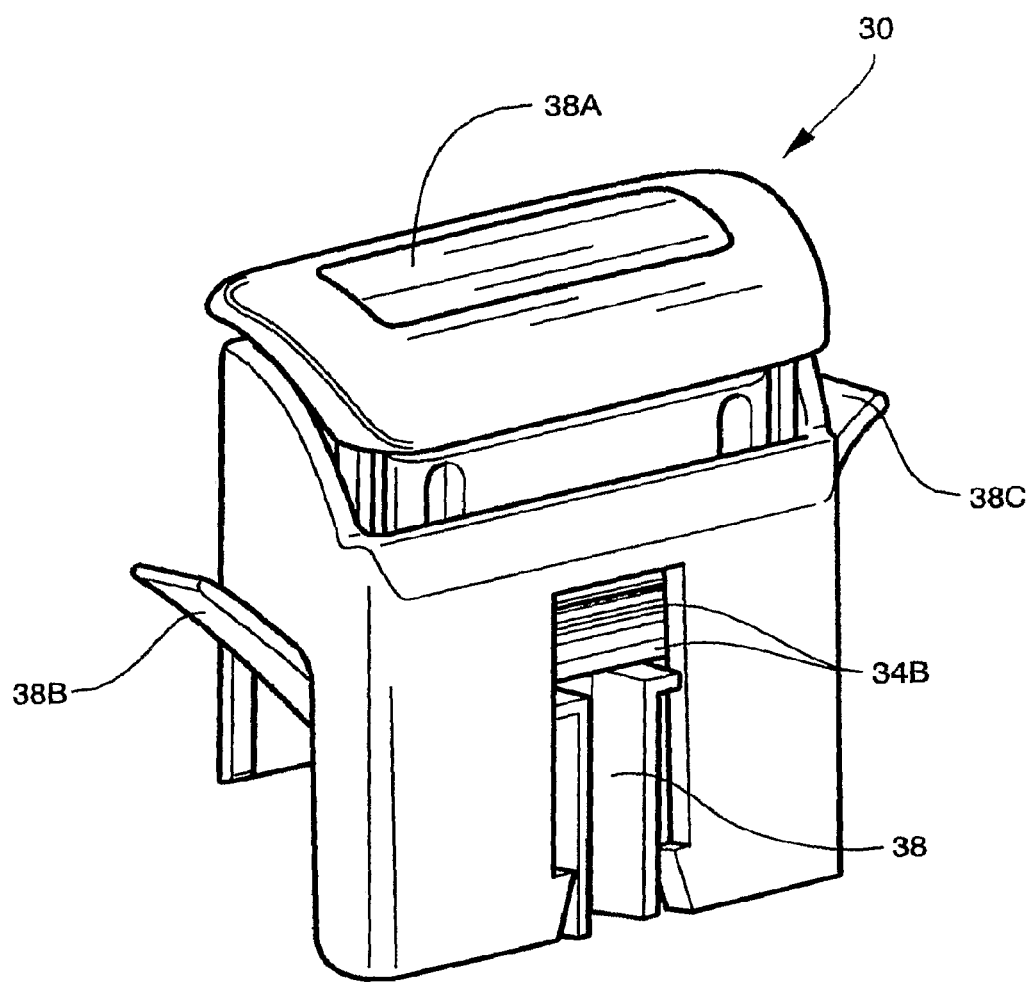
FIG. 10 is an assembled view of the seat position indicator in the "upright" position.
Figure 11:
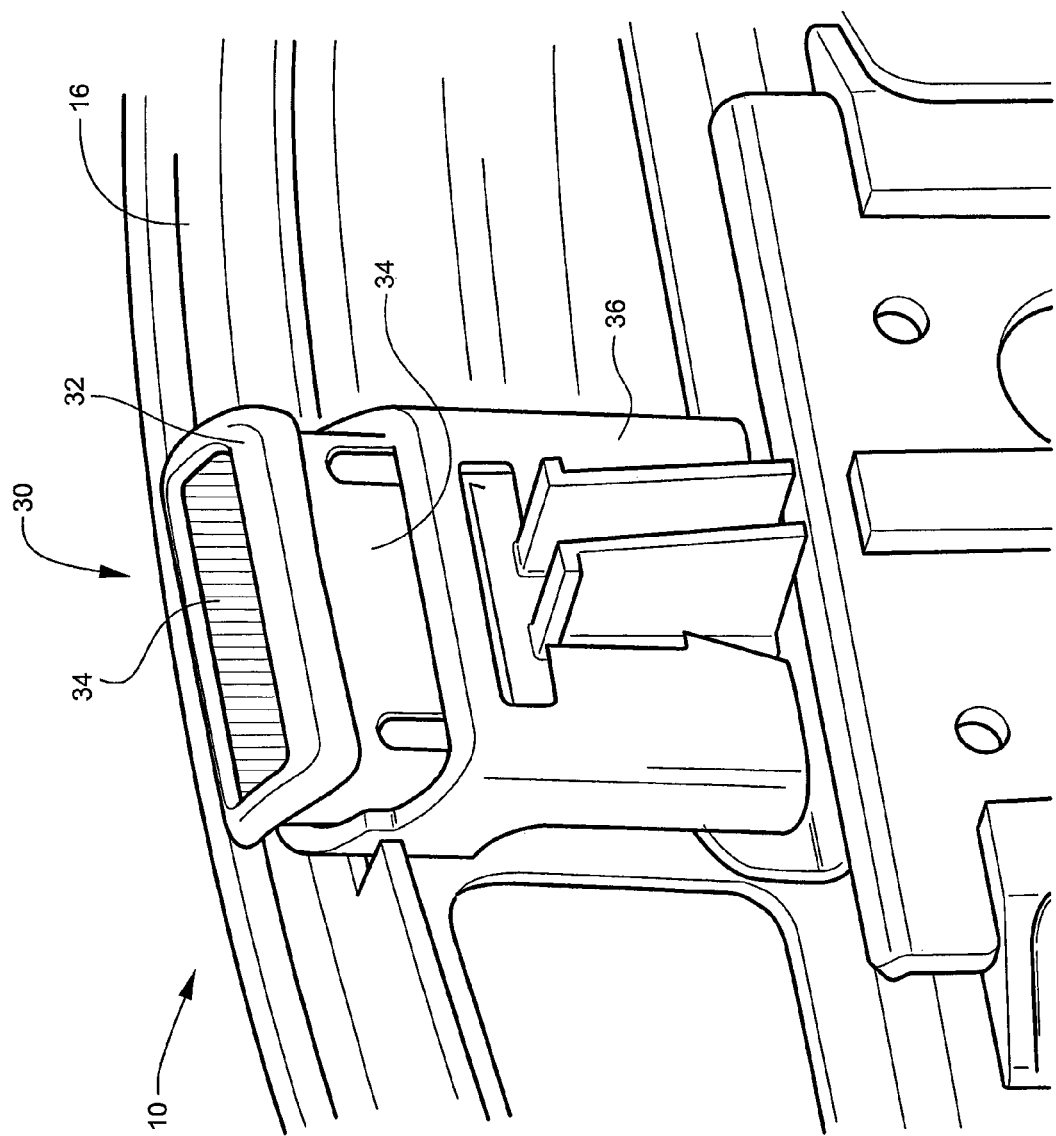
FIG. 11 is a perspective view of the upper portion of the seat back shell assembly showing the seat back indicator in a "seat back reclined" position.
Figure 12:
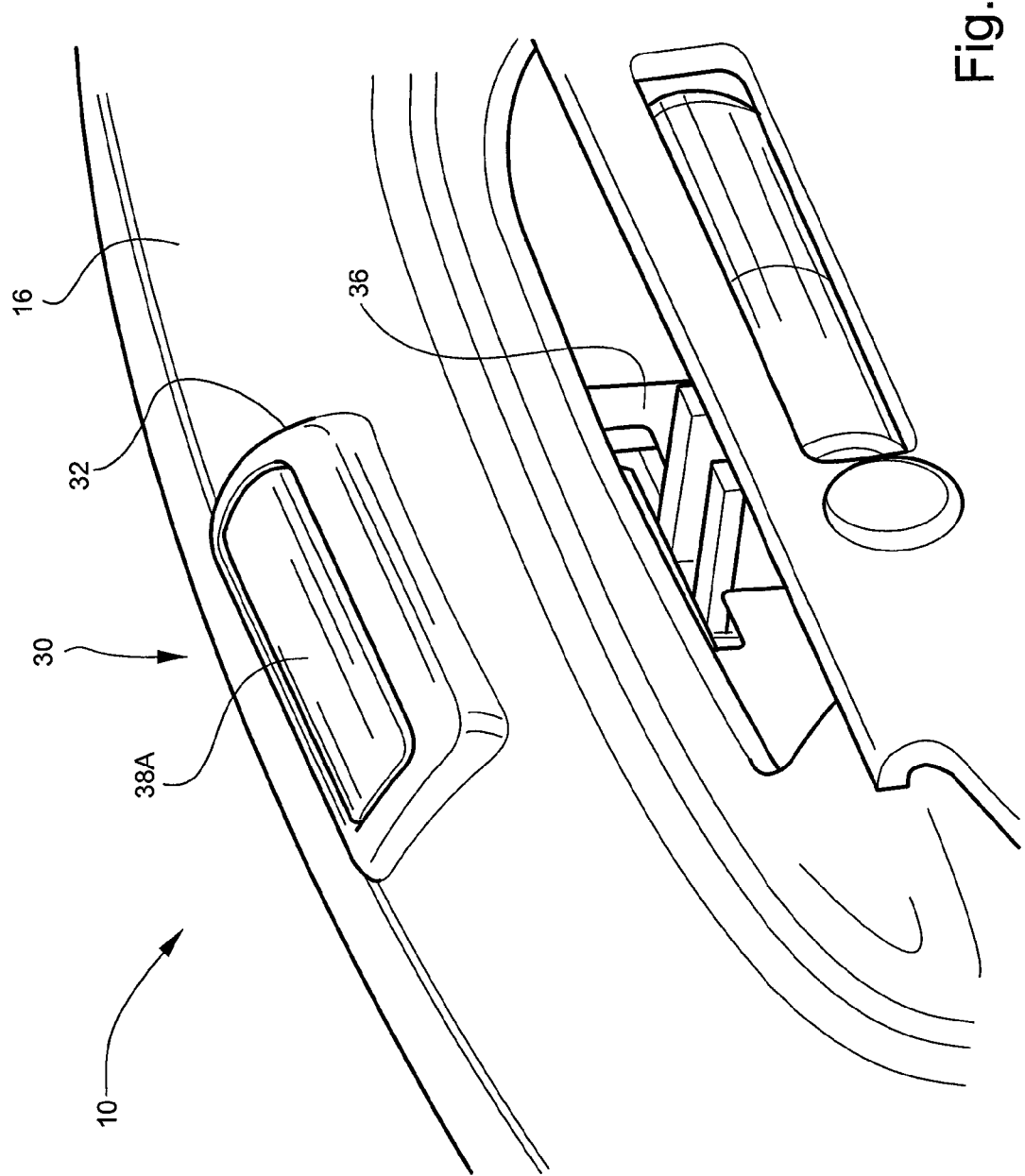
FIG. 12 is a perspective view of the upper portion of the seat back shell assembly showing the seat back indicator in the "upright" position.

Referring now to FIGS. 9 and 10, a button 38 is fitted into the assembled bezel 32, indicator collar 34 and surround 36. The button 38 includes a visible button top portion 38A sized to fit within the indicator collar 34, and two resilient side wings 38B and 38C that extend through side openings in the surround 36. As assembled in the seat, the wings 38B and 38C come into contact with the surround 36 and flex downward. This causes the button 38 to be sprung down and aides in the retraction of the button 38 when the pusher 22 is drawn down, as when the seat back is in a reclined position.

When in the take-off and landing position, the pusher 22 lifts the button 38 in the bezel 32 to a position generally flush with the top of the bezel 32. This is shown in for example, FIG. 10. The button top portion 38A and the surrounding seat back shell assembly 16 are preferably of the same or similar color, allowing the button top portion 38A to be non-apparent to the passenger and observed by the cabin staff as indicating that the seat back assembly 14 is in the proper upright position. The pusher 22 does not act to draw the button 38 downward. Rather, the pusher 22 draws itself out of the way of the button 38, allowing the button 38 to move down on its own using the wings 38B, 38C as springs. If seat back movement and the button 38 were directly linked, the button 38 would have to move a large distance during recline. With the disclosed design the seat back assembly 14 can move a great distance, but the button 38 only moves just enough to show the "not upright" color. This keeps the device small and lightweight.

When the seat back assembly 14 is not in the proper upright position, the button 38 and the button top portion is positioned at a lower position inside the bezel 32. The indicator collar 34 is preferably of a contrasting, readily observable color or pattern, and with the button 38 in the lower position the color or pattern of the inside wall of the indicator collar 34 is visible to the cabin staff and indicates that the seat is not in the upright position, as shown in FIGS. 9 and 10.

The indicator 30 may be located in one of several locations on the seat back shell assembly 16, but the illustrated location is considered preferable in that it is at the highest, most easily visible surface on the seat 10 when viewed from above as would be the case when being observed by a member of the cabin staff. At the same time, the bezel 32 would ordinarily not be visible by someone seated in the seat, or in a seat aft of the seat 10, thus reducing the possibility of tampering or abuse by passengers. The absence of a lighted indicator reduces cost of the initial installation and maintenance of the system, is less obtrusive and more in keeping with a desire to maintain a relaxed, comfortable environment within the aircraft cabin. However, in certain applications it may be desirable to provide a means of electronically relaying the seat back position to a remote location, as described above.

Figure 14:
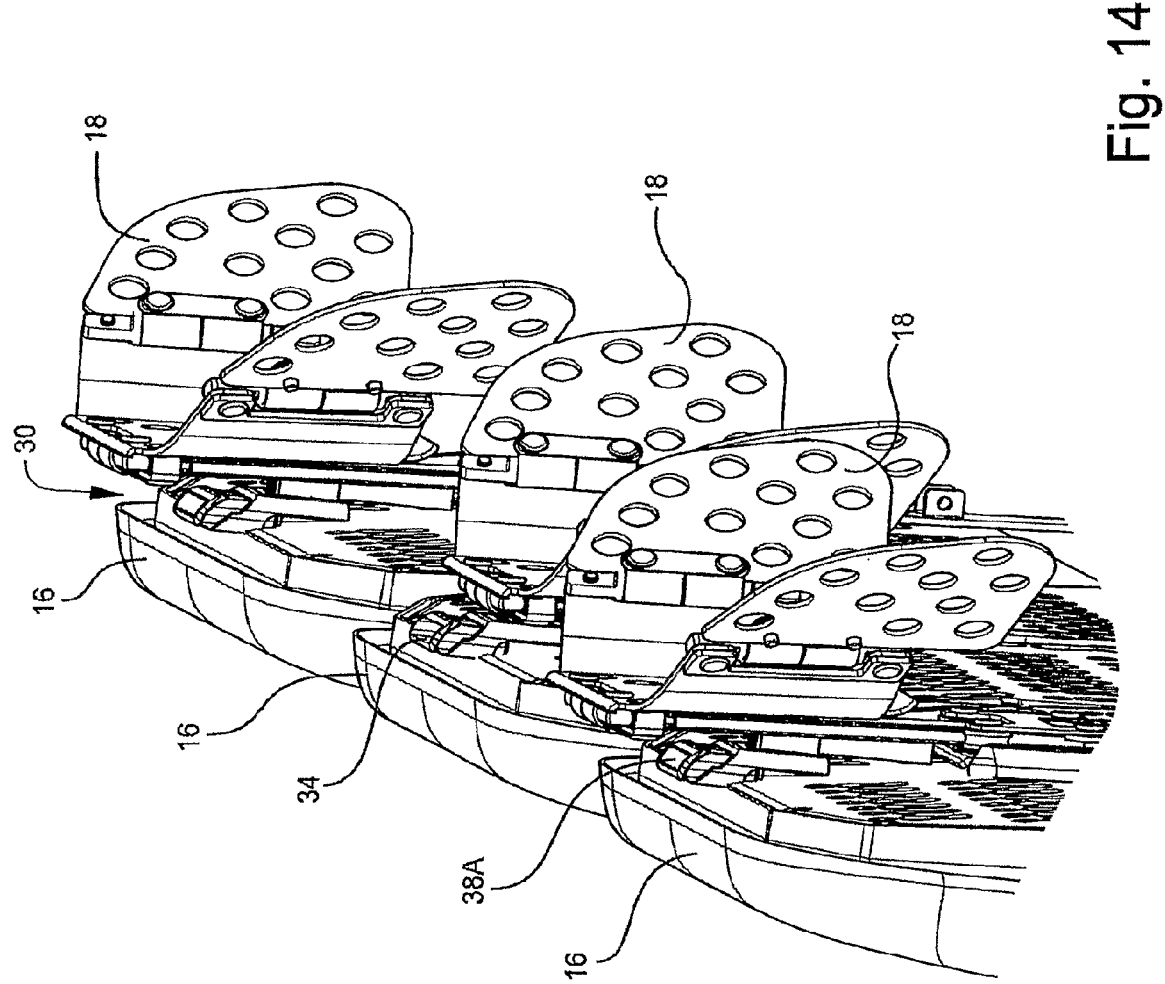
FIG. 14 is a closer perspective view of the uppermost portion of the seat backs of the seats shown in FIG. 13.

Referring now to FIGS. 13 and 14, it is apparent that the seat back shell assemblies 16 of the three seats 10 are themselves at the same height in a fixed position. The seat backrest 15 of the center seat 10, however, is in a lowered position. This would not be apparent to a passing flight attendant because of the position of the fixed seat back shell assembly 16. However, as is best shown in FIG. 14, the flight attendant can easily see that the indicator collar 34 is visible, whereas the buttons 38 fill the bezels 32 on the two outboard seats 10.

While illustrated and described with reference to a passenger seat with a generally stationary seat back shell assembly, the seat position indicator may also have application in other types of seats, including seats with seat backs that have only slight rearward or vertical movement during seat adjustment. The essential point is to provide a readily visible indicator to the cabin staff of the position of the seat back. It is considered advantageous to position the indicator in a location that is unobtrusive to the seated passengers, and that the indicator itself be unobtrusive and of significance only to the cabin staff. The disclosed mechanism could be designed to work in reverse such that the button is colored and rises above the surface of the seat back to indicate a "not upright" configuration. This is considered to be inferior to the above disclosure of this application since it would be visibly unattractive and could more easily be broken.

An aircraft passenger seat with a seat back position indicator is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A visual seat position indicator apparatus for providing an indication that a seat having a seat bottom, and a seat back movable between reclined and an upright position, is in either its upright or reclined position, comprising:
   (a) a visual indicator mounted for movement on a visually-exposed surface of an upper portion of the seat back; and
   (b) a mechanical linkage positioned between the visual indicator and the seat back for moving the indicator in response to movement of the seat back, the relationship of the indicator to the seat back providing a visual indication of the position of the seat back,
   wherein the seat back includes a stationary seat back shell assembly within which the seat back moves, and further wherein the indicator is mounted for movement on a visually-exposed surface of seat back shell assembly to provide a visual indication of the position of the seat back within the seat back shell assembly.

2. A visual seat position indicator apparatus according to claim 1, wherein the indicator is a button mounted on the upper portion of the seat back.

3. A visual seat position indicator apparatus according to claim 2, and including a bezel mounted on the upper portion of the seat back and surrounding the button, the position of the button in relation to the surrounding bezel providing the visual indication of the position of the seat back.

4. A visual seat position indicator apparatus according to 2, wherein the linkage includes a pusher acting on the button.

5. A visual seat position indicator apparatus according to claim 1, and wherein the indicator includes:
   (a) a bezel mounted on an upper, visually-exposed surface of the seat back shell assembly;
   (b) a button mounted for movement within the bezel; and
   (c) a linkage mounted on the seat back and acting on the button to move the button in relation to the bezel to provide a visual indication of the position of the seat back within the seat back shell assembly.

6. A visual seat position indicator apparatus according to claim 5, wherein the linkage is adapted to allow the button to move downwardly into the bezel to expose adjacent interior walls of the bezel as the seat back is reclined, and further wherein the interior wall of the bezel has a surface condition that is visually distinct from the surface condition of the button, wherein when the button is withdrawn into the bezel, the interior walls of the bezel provide the visual indication that the seat back is in the reclined position.

7. A visual seat position indicator apparatus according to 6, wherein the linkage includes a pusher interconnecting the button and the seat back.

8. A visual seat position indicator apparatus according to 6, wherein the linkage includes a pusher acting on the button during movement of the seat back.

9. A visual seat position indicator apparatus according to claim 6, wherein the surface condition of the interior wall of the bezel comprises a color and the surface condition of the button comprises a color that is visually distinct from the color of the interior wall of the bezel, wherein when the button is withdrawn into the bezel, the interior walls of the bezel provide the visual indication that the seat back is in the reclined position.

10. An aircraft passenger seat, comprising:
(a) a base on which is positioned a seat bottom and a seat back movable between a reclined and an upright position;
(b) a visual seat back position indicator mounted for movement on a visually-exposed surface of an upper portion of the seat back; and
(c) a mechanical linkage acting on the visual indicator and the seat back for moving the indicator in response to movement of the seat back, the relationship of the position of the indicator to the seat back providing a visual indication of the position of the seat back,
wherein the seat back includes a stationary seat back shell assembly within which the seat back moves, and further wherein the indicator is mounted for movement on a visually-exposed surface of seat back shell assembly to provide a visual indication of the position of the seat back within the seat back shell assembly.

11. An aircraft passenger seat according to claim 10, wherein the indicator is a button mounted on the upper portion of the seat back.

12. An aircraft passenger seat according to claim 11, and including a bezel mounted on the upper portion of the seat back and surrounding the button, the position of the button in relation to the surrounding bezel providing the visual indication of the position of the seat back.

13. An aircraft passenger seat according to 11 or 12, wherein the linkage includes a pusher acting on the button during movement of the seat back.

14. An aircraft passenger seat according to claim 10, and wherein the indicator includes:

(a) a bezel mounted on an upper, visually-exposed surface of the seat back shell assembly;
(b) a button mounted for movement within the bezel; and
(c) a linkage attached to the seat back and acting on the button for moving the button in relation to the bezel to provide a visual indication of the position of the seat back within the seat back shell assembly.

15. An aircraft passenger seat according to claim 14, wherein the linkage is adapted to allow the button to move downwardly into the bezel to expose adjacent interior walls of the bezel as the seat back is reclined, and further wherein the interior wall of the bezel has a surface condition that is visually distinct from the surface condition of the button, wherein when the button is withdrawn into the bezel the interior walls of the bezel provide the visual indication that the seat back is in the reclined position.

16. An aircraft passenger seat according to claim 15, wherein the linkage includes a pusher interconnecting the button and the seat back.

17. An aircraft passenger seat according to claim 15, wherein the linkage includes a pusher acting on the button during movement of the seat back.

18. An aircraft passenger seat according to claim 15, wherein the surface condition of the interior wall of the bezel comprises a color and the surface condition of the button comprises a color that is visually distinct from the color of the interior wall of the bezel wherein, when the button is withdrawn into the bezel, the interior walls of the bezel provide the visual indication that the seat back is in the reclined position.

* * * * *